United States Patent
Inagaki et al.

(10) Patent No.: US 8,500,335 B2
(45) Date of Patent: Aug. 6, 2013

(54) MANUFACTURING METHOD OF HALF BEARING AND HALF PLAIN BEARING

(75) Inventors: Michitoshi Inagaki, Inuyama (JP); Tsuyoshi Nakashima, Inuyama (JP)

(73) Assignee: Daido Metal Company Ltd., Aichi (JP)

( * ) Notice: Subject to any disclaimer, the term of this patent is extended or adjusted under 35 U.S.C. 154(b) by 185 days.

(21) Appl. No.: 13/059,212

(22) PCT Filed: Jul. 30, 2010

(86) PCT No.: PCT/JP2010/062942
§ 371 (c)(1),
(2), (4) Date: Feb. 15, 2011

(87) PCT Pub. No.: WO2012/014323
PCT Pub. Date: Feb. 2, 2012

(65) Prior Publication Data
US 2012/0027328 A1    Feb. 2, 2012

(51) Int. Cl.
*F16C 33/02* (2006.01)
*F16C 9/02* (2006.01)

(52) U.S. Cl.
USPC .......................................... 384/295; 384/294

(58) Field of Classification Search
USPC ................ 384/272, 273, 275, 288, 294–296, 384/429, 430, 432–434; 29/898.042, 29/898.045–898.047, 898.054, 898.057, 29/898.07; 403/195, 234, 256, 331; 74/593, 74/594
See application file for complete search history.

(56) References Cited

U.S. PATENT DOCUMENTS

| | | |
|---|---|---|
| 4,775,249 A | 10/1988 | Roemer et al. |
| 7,263,774 B2 * | 9/2007 | Caspers et al. ........... 29/898.057 |
| 7,618,190 B2 | 11/2009 | Schrufer |

FOREIGN PATENT DOCUMENTS

| | | | |
|---|---|---|---|
| DE | 103 14 435 A1 | | 10/2004 |
| JP | 59-50226 A | | 3/1984 |
| JP | 07197939 A | * | 8/1995 |
| JP | 9-210064 A | | 8/1997 |
| JP | 2005-536696 T | | 12/2005 |

* cited by examiner

*Primary Examiner* — Alan Waits
(74) *Attorney, Agent, or Firm* — Browdy and Neimark, PLLC (57) ABSTRACT

A half plain bearing that has a positioning member with a novel construction, and a manufacturing method of the half plain bearing are proposed. If part of a material from which a bearing body 13 is formed is allowed to escape to outside of a tool with a narrow width when pressed by the tool, an amount of protrusion needed for a positioning member 20 to perform a function thereof (an amount of protrusion from an outer peripheral face of the bearing body) can be ensured while suppressing an amount of deformation of the material from which the bearing body 13 is formed in a circumferential direction thereof. The positioning member 20 of the half plain bearing thus formed has a flat portion 21a and a protrusion portion 22. A tip of the protrusion portion 22 is located on a mating face side with respect to a virtual plane that includes the flat portion 21a.

4 Claims, 11 Drawing Sheets

|  | HV HARDNESS | X, X' | Y, Y' | Z, Z' | W, W' | Y/Z, Y'/Z' |
|---|---|---|---|---|---|---|
| ARTICLE OF EXAMPLE 1 | 160 | 1.4 | 0.76 | 3.6 | 1.1 | 0.21 |
| ARTICLE OF EXAMPLE 2 | 160 | 1.6 | 0.95 | 3.7 | 1.3 | 0.26 |
| ARTICLE OF EXAMPLE 3 | 220 | 1.4 | 0.86 | 3.1 | 1.3 | 0.28 |
| ARTICLE OF COMPARATIVE EXAMPLE 1 | 160 | 1.4 | 0.77 | 4.0 | 1.4 | 0.19 |

MANUFACTURING METHOD OF HALF BEARING AND HALF PLAIN BEARING

TECHNICAL FIELD

The present invention relates to a manufacturing method of a half plain bearing, and a half plain bearing.

BACKGROUND ART

A half plain bearing is used as, for example, a bearing that is assembled with a connecting rod of an automotive engine to allow a crankpin of a crankshaft inserted through the connecting rod to smoothly rotate with respect to the connecting rod.

In assembling a half plain bearing with a bearing housing (e.g., a connecting rod or the like), a positioning member is formed so as to protrude from an outer peripheral face of the half plain bearing, a fitting groove (a recess) is formed in the bearing housing, and the positioning member is fitted in the fitting groove, thereby positioning the half plain bearing with respect to the bearing housing.

It should be noted herein that in order to improve the positioning function by facilitating the axial positioning of the half plain bearing with respect to the bearing housing, it is desirable to make the amount of radially outward protrusion of the positioning member from the outer peripheral face of the half plain bearing as large as possible in accordance with the dimension of the fitting groove of the bearing housing.

A half plain bearing described in Patent Document 1 includes a semi-cylindrical bearing body, and a positioning member formed on a mating face of the bearing body. The positioning member includes a flat portion biased (recessed) from the mating face in a circumferential direction of the bearing body, and a protrusion portion protruding outward from the flat portion in a radial direction of the bearing body. An upper face of the protrusion portion is flush with the flat portion, that is, both exist on the same virtual plane.

The half plain bearing thus constructed can be manufactured as follows.

First, the semi-cylindrical bearing body is prepared. A flat working face of a tool is abutted against an outer peripheral region of the mating face (a parting face) of this bearing body (see FIG. 8), and then pressed to plastically deform a material from which the outer peripheral face side of the bearing body is formed, as well as the outer peripheral region of the mating face. As a result, the material from which the bearing body is formed spreads radially outward along the tool.

The upper face of the positioning member thus formed (an abutting face of the tool) assumes a shape that follows the working face of the tool, that is, the upper face becomes a flat face.

It is also advisable to refer to Patent Document 2 and Patent Document 3 as literature concerning the present invention.

CITATIONS OF RELATED ART

Patent Documents

Patent Document 1: Japanese Patent Unexamined Publication No. S59-50226

Patent Document 2: Japanese Patent Unexamined Publication No. H09-210064

Patent Document 3: Japanese Patent Unexamined Publication (Published Japanese Translation of PCT Application) No. 2005-536696

DISCLOSURE OF THE INVENTION

Problem to be Solved by the Invention

As already described, in order to obtain an excellent positioning function, it is preferable to make the protrusion amount of the positioning member as large as possible.

However, when the positioning member is formed according to the method described in Patent Document 1, the deformation amount of the material from which the bearing body is formed also increases as the protrusion amount of the positioning member increases.

As a result, unexpected deformation of the bearing body may adversely affect the performance of the bearing, and restrictions on the selection of the material of the bearing body may limit the degree of design freedom of the half plain bearing. Further, when the positioning member is formed according to the method described in Patent Document 3, there is a risk of decreased durability of the tool resulting from an increase in the stress applied to the tool. This in turns causes a reduction in manufacturing efficiency.

Means for Solving the Problem

After conducting a series of focused studies to solve at least one of the aforementioned problems, the inventors of the present application have reached a conclusion that, if a material from which a bearing body is formed is pressed by a tool with a narrow width such that part of the material is allowed to escape to outside of the tool, a protrusion amount of a positioning member (an amount of protrusion of the positioning member from an outer peripheral face of the bearing body) that is needed for the positioning member to perform the function thereof can be ensured while suppressing an amount of deformation of the material from which the bearing body is formed in a circumferential direction thereof.

That is, a first aspect of this invention is prescribed as follows.

In a manufacturing method of a half plain bearing that includes a semi-cylindrical bearing body, and a positioning member that is formed on a mating face of the bearing body by pressing a tool against an outer peripheral region of the mating face of the bearing body, and deforming radially outward a material from which the bearing body is formed and the outer peripheral region of the mating face, the tool is pressed against the outer peripheral region of the mating face to plastically deform the material from which the bearing body is formed so as to be in a position close to an outer face of the tool, thereby forming the positioning member.

According to the manufacturing method of the first aspect of the present invention, the material from which the outer peripheral side of the bearing body is formed is plastically deformed so as to be in the position close to the outer face of the tool, that is, so as to wrap around. Therefore, deformation of the bearing body is suppressed, especially in a circumferential direction thereof, in a manner corresponding to the amount of wraparound.

Due to the material that has wrapped around to the outer face of the tool, a certain amount of protrusion from the outer peripheral face of the bearing body can be guaranteed. Therefore, the positioning function demanded for the positioning member can also be ensured.

In order to cause the material of the bearing body to wrap around to the outer face of the tool, the tool used must be relatively thin. According to the studies conducted by the inventors, a face (a first face) of the tool brought into abutment with the mating face of the bearing body is substantially perpendicular to a pressing direction, and has a width (in a radial direction of the bearing body) that is appropriately selected in accordance with the material, structure, and the like of the bearing body. However, in relation to an outer edge of the mating face of the bearing body (a line of intersection between the outer peripheral face and the mating face of the bearing body), a tip of an outer face (a second face) of the tool on the first face side coincides in position with the outer edge of the bearing body, or is radially shifted from the outer edge of the bearing body within a length range of ±30% of the width of the first face at the time of positional coincidence with the outer edge. It is preferable that the tip of the second face be shifted outward from the outer edge of the bearing body within 30% of the width of the first face at the time of positional coincidence with the outer edge (that the first face be larger in width than at the time of positional coincidence with the outer edge), because the material from which the bearing body is formed is likely to wrap around to the outer face side of the tool. Further, it is preferable that the tip of the second face be shifted toward a central axis side from the outer peripheral face of the bearing body within 30% of the width of the first face at the time of positional coincidence with the outer edge (that the first face be smaller in width than at the time of positional coincidence with the outer edge), because the protrusion portion is thus easily ensured of a sufficient protrusion amount.

From the standpoint of the durability of the tool used in this manufacturing method, it is preferable that a working face (the first face) and the outer face (the second face) form a right angle or an obtuse angle therebetween. It is also desirable that the material from which the bearing body is formed be out of contact with the outer face (the second face) of the tool while the tool is pressed in a direction perpendicular to the mating face.

As a more preferable variant of the tool, the working face and a region of the outer face which continues thereto are designed as flat faces and made perpendicular to each other. Further, it is preferable that a region of an inner face which continues to the working face also be designed as a flat face and made perpendicular to the working face.

The positioning member formed as described above can be prescribed as follows.

That is, a half plain bearing includes a semi-cylindrical bearing body, and a positioning member formed on a mating face of the bearing body. The positioning member includes a flat portion biased from the mating face in a substantially circumferential direction of the bearing body, and a protrusion portion protruding radially outward from the flat portion. The protrusion portion has a tip located on the mating face side with respect to a virtual plane that includes the flat portion.

In the half plain bearing thus prescribed, the material of the bearing body that has wrapped around to the outer face of the tool constitutes the protrusion portion, which is flexed upward (toward the mating face side) from the flat portion.

Therefore, deformation of the material from which the bearing body is formed is suppressed in the circumferential direction thereof, and a protrusion amount that is needed for the positioning member to perform the function thereof is ensured.

Accordingly, the half plain bearing can be easily and reliably fixed to a housing, which contributes to improved performance of the bearing in terms of fatigue properties and the like. Further, it is also possible to make a fitting groove formed in the housing smaller in size.

According to the half plain bearing thus constructed, the positioning member thereof has the flat portion, and the protrusion portion protruding radially outward from this flat portion. The tip of the protrusion portion is located above the virtual plane that includes the flat portion, namely, on the mating face side.

By biasing the tip side of the protrusion portion toward the mating face side in this manner, the distance between a plane that includes the mating face and the tip of the protrusion portion becomes shorter. It is thus easy to interfere with a partner housing that is to be assembled in a covering manner with the housing of the half plain bearing, and a member of the partner housing which is to be interfered with can be downsized.

BEST MODES FOR CARRYING OUT THE INVENTION

Figure 1A:
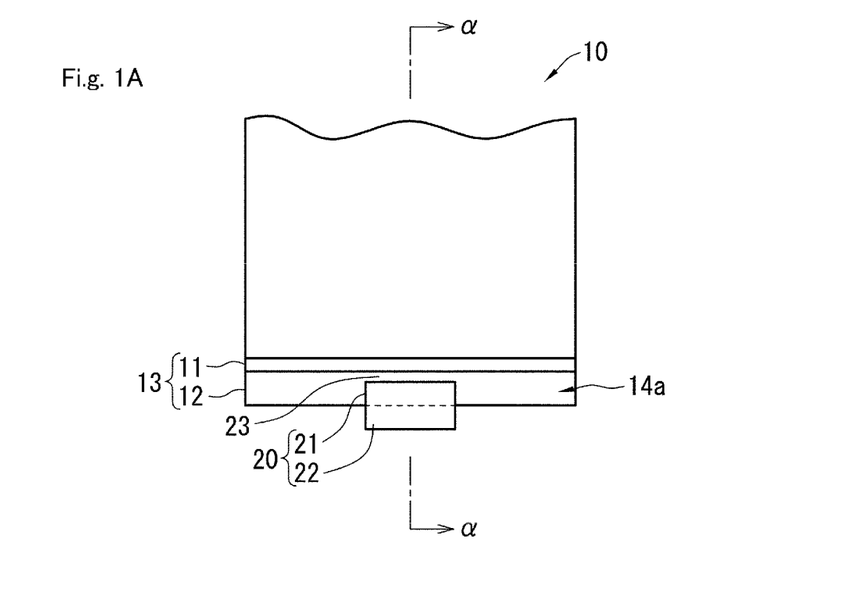
FIG. 1(A) is a top view of an essential part of a half plain bearing 10 according to one embodiment as a concrete form of the present invention.
Figure 1B:
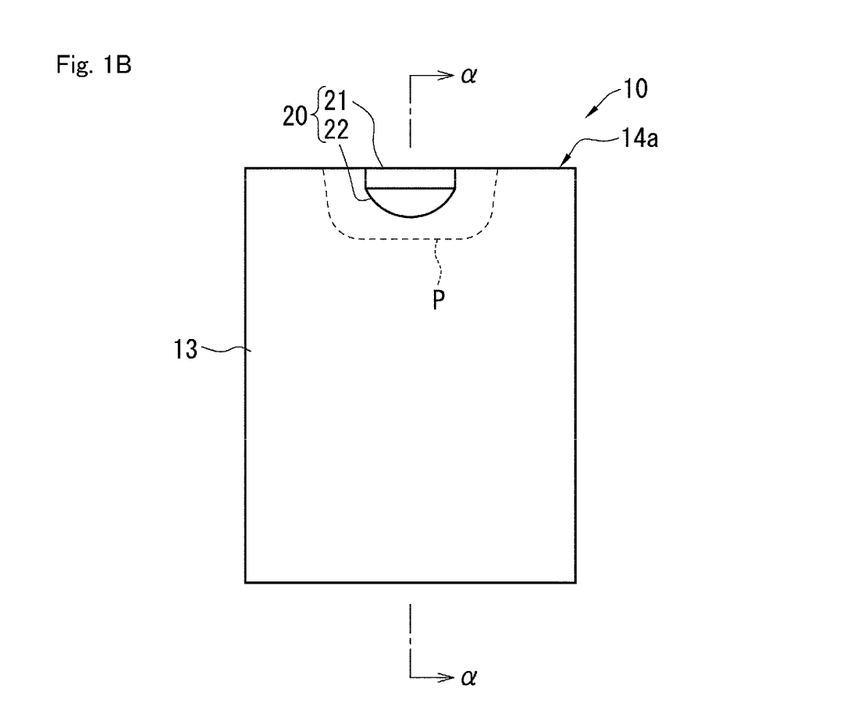
FIG. 1(B) is a lateral view of the half plain bearing 10.

A half plain bearing 10 according to one embodiment as a concrete form of the present invention will be described hereinafter with reference to the drawings.
Construction of Half Plain Bearing 10 According to Present Embodiment FIG. 1(A) is a top view of an essential part of the half plain bearing 10. FIG. 1(B) is a lateral view of the half plain bearing 10.

Figure 2:
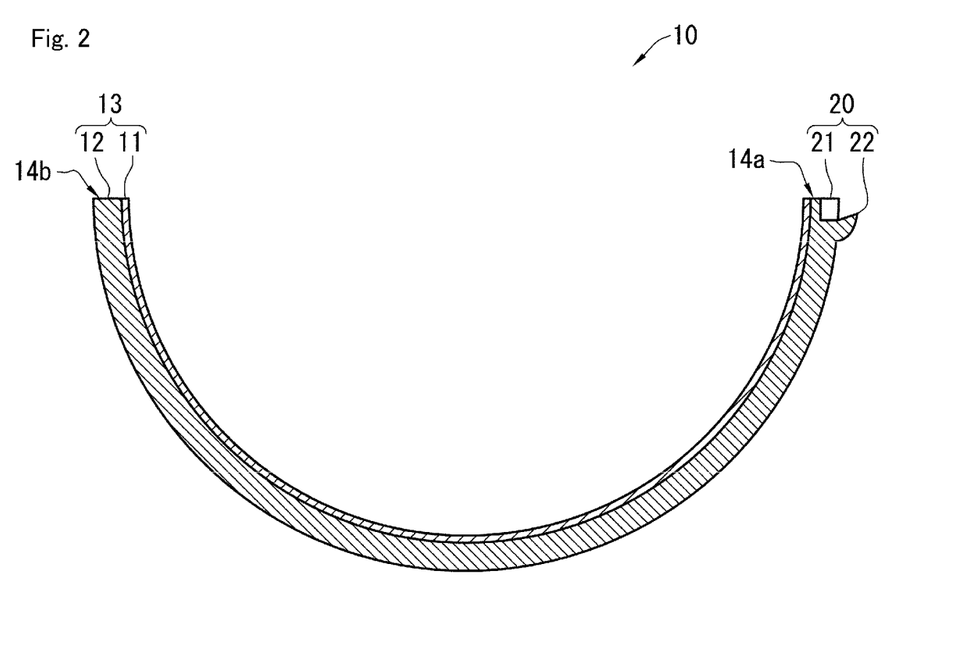
FIG. 2 is a longitudinal sectional view of the half plain bearing 10 cut perpendicular to an axis thereof, taken along a line α-α shown in FIG. 1.

FIG. 2 is a longitudinal sectional view of the half plain bearing 10 cut perpendicular to an axis thereof, taken along a line α-α shown in FIG. 1.

Figure 3:
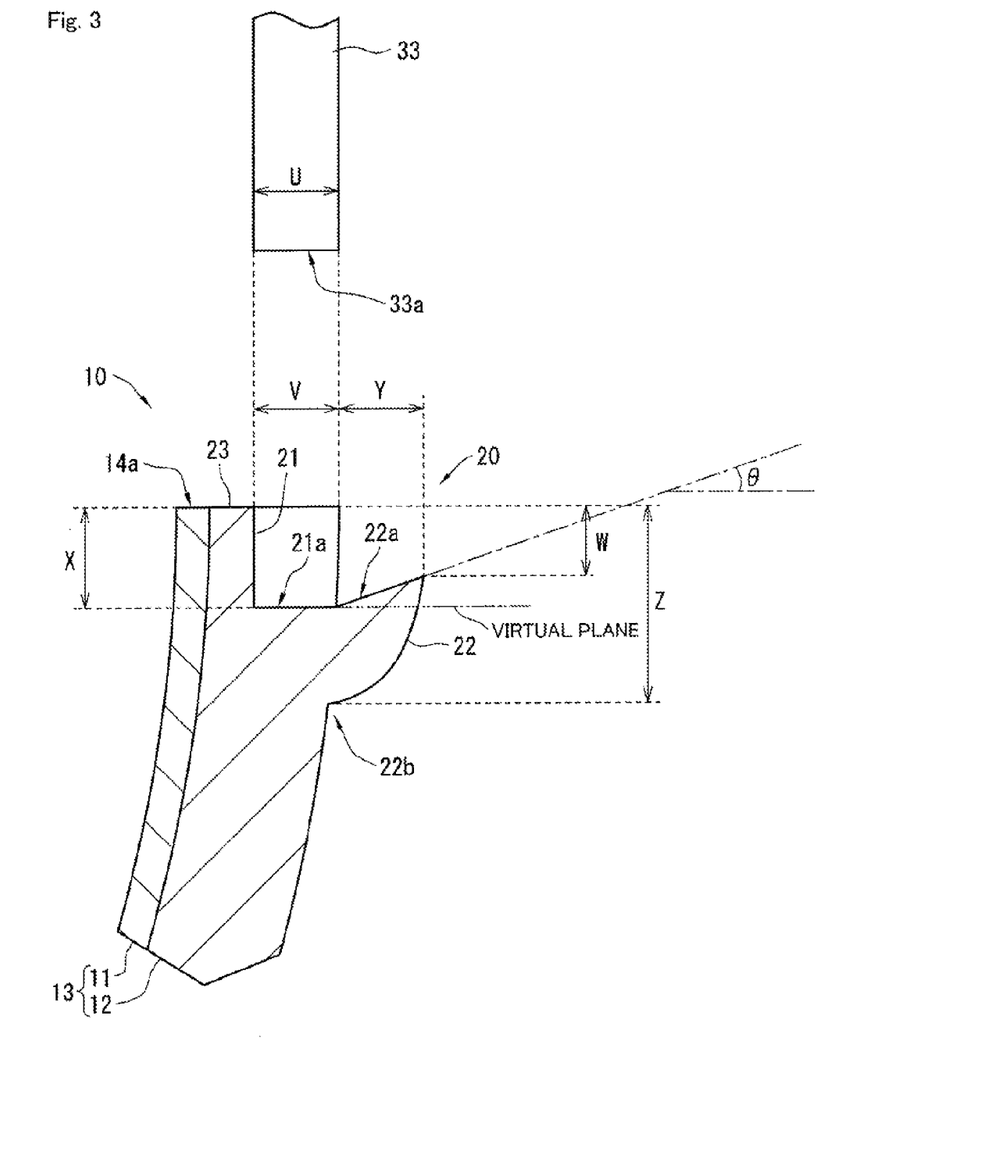
FIG. 3 is a longitudinal sectional view of an essential part of the half plain bearing 10 in the vicinity of a positioning member 20.

FIG. 3 is a longitudinal sectional view showing an essential part of the half plain bearing 10 in the vicinity of a positioning member (a positioning pawl) 20.

If the half plain bearing 10 is a double-layer structure (a bimetallic type), a back metal layer 12 is superposed on and integrated with an outer peripheral face of a sliding layer 11. The back metal layer 12 and the sliding layer 11 are curved in a semi-cylindrical manner as a whole to constitute a bearing body 13.

The sliding layer 11 is made of, for example, an Al alloy or a Cu alloy, which has properties suited for a plain bearing (e.g., low friction, wear resistance, fatigue resistance, anti-seizing property, conformability, and the like).

The back metal layer 12 is provided to enhance the strength of the half plain bearing 10, and is made of steel, for example.

This specification cites an example of the half plain bearing 10 whose diameter ranges from about 40 mm to about 80 mm and whose thickness, namely, the sum of the thicknesses of the sliding layer 11 and the back metal layer 12, ranges from about 1.5 mm to about 3.0 mm.

Both curved edges of the bearing body 13 constitute mating faces (a parting face or an abutting face) 14a and 14b, respectively. A single positioning member 20 is formed at a substantially central position of the mating face 14a in an axial direction of the half plain bearing 10. The number of positioning members 20 to be formed and the position of each positioning member 20 may be arbitrarily determined in accordance with the application or shape of the half plain bearing 10.

The positioning member 20 is constituted from a recess portion 21 and a protrusion portion 22, and formed on the back metal layer 12.

As shown in FIG. 3, the recess portion 21 is a recess with a U-shaped like cross section formed in an outer peripheral face of the back metal layer 12 (the bearing body 13). The recess portion 21 opens to the mating face 14a.

A flat bottom face portion (a flat portion) 21a is formed on a bottom face side of the recess portion 21.

A back wall portion 23 with a substantially uniform thickness is formed on the back metal layer 12 between the recess portion 21 and the sliding layer 11. That is, the back wall portion 23 is formed between the recess portion 21 and an inner peripheral face of the bearing body 13.

The sliding layer 11, which is located behind the back wall portion 23, is not deformed. An inner peripheral face of the sliding layer 11 is smooth overall.

The protrusion portion 22 is an outward projection of a material from which the outer peripheral face side of the back metal layer 12 (the bearing body 13) is formed in a radial direction of the half plain bearing 10.

A substantially flat inner face portion 22a, which slightly bulges, is formed on an inner face side of the protrusion portion 22.

The inner face portion 22a, which continues to the flat portion 21a of the recess portion 21, is an inclined face that forms an acute angle θ of inclination with respect to the flat portion 21a.

This angle θ of inclination may be arbitrarily set, preferably to 10° to 50°, and more preferably to 20° to 40°.

Here, the dimensions of respective portions of the positioning member 20 will be referred to as follows. Namely, the width of the flat portion 21a of the recess portion 21 in the radial direction of the half plain bearing 10 is expressed as a "dimension V", the distance between the mating face 14a and a tip region of the protrusion portion 22 is expressed as a "dimension W", the distance between the mating face 14a and the flat portion 21a is expressed as a "dimension X", the distance in the radial direction of the half plain bearing 10 from an outer edge of the mating face 14a (a line of intersection between the outer peripheral face and the mating face 14a of the bearing body 13) to a tip region of the protrusion portion 22 is expressed as a "dimension Y", and the distance from the mating face 14a to a lower edge 22b of the positioning member 20 in a direction perpendicular to the radial direction is expressed as a "dimension Z".
Method of Forming Positioning Member 20 According to Present Embodiment FIG. 4 is a perspective view for explaining a method of forming (a method of manufacturing or constructing) the positioning member 20 for the half plain bearing 10.

Figure 5:
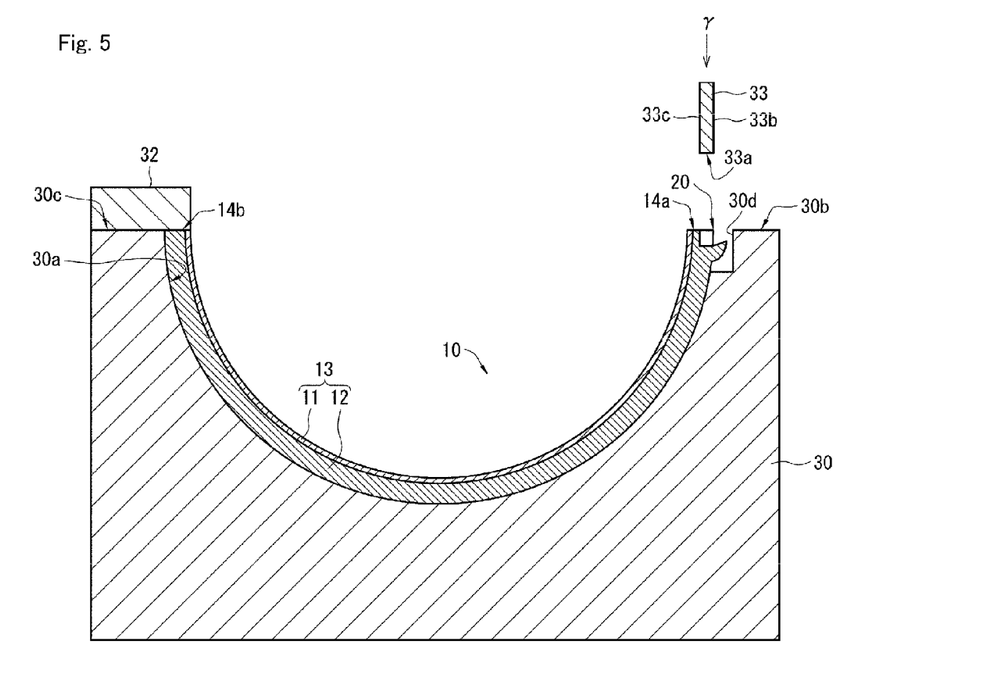
FIG. 5 is a longitudinal sectional view for explaining the method of forming the positioning member 20, taken along a line β-β shown in FIG. 4.

FIG. 5 is a longitudinal sectional view for explaining the method of forming the positioning member 20, taken along a line β-β shown in FIG. 4.

Figure 6A:
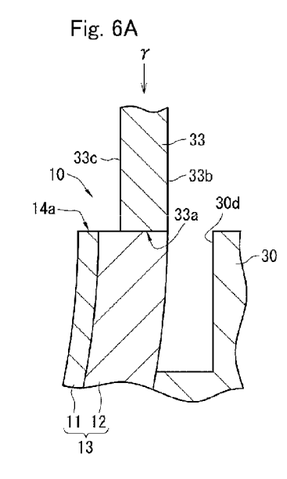
FIG. 6 shows longitudinal sectional views of an essential part for explaining a process of forming the positioning member 20.
Figure 6B:
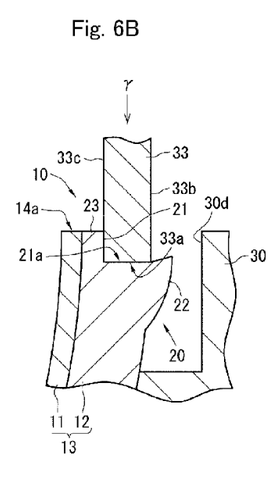
Figure 6C:
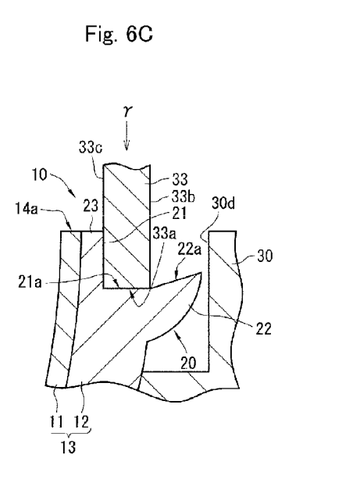
Figure 7:
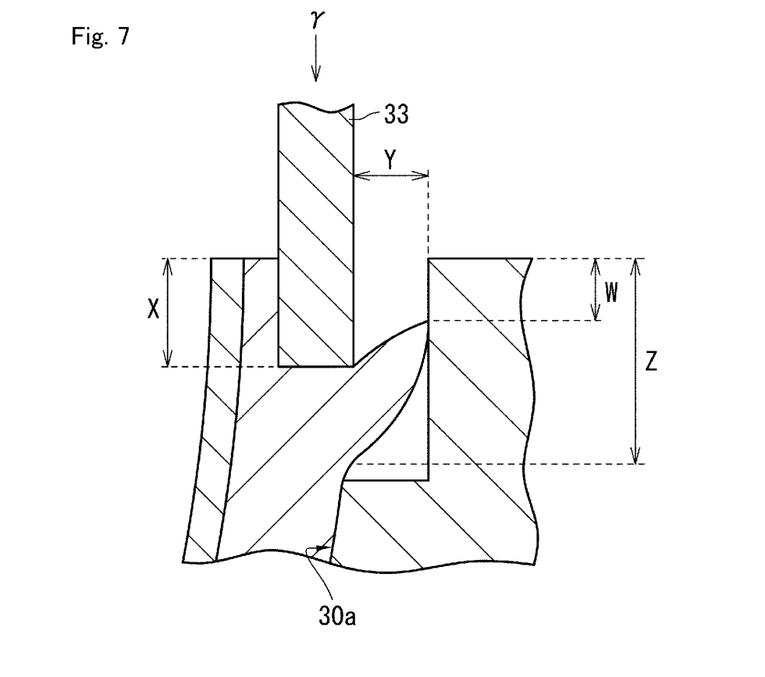
FIG. 7 is a longitudinal sectional view of an essential part for explaining the process of forming the positioning member 20.

FIGS. 6 and 7 are longitudinal sectional views of an essential part for explaining a process of forming the positioning member 20.

Figure 4:
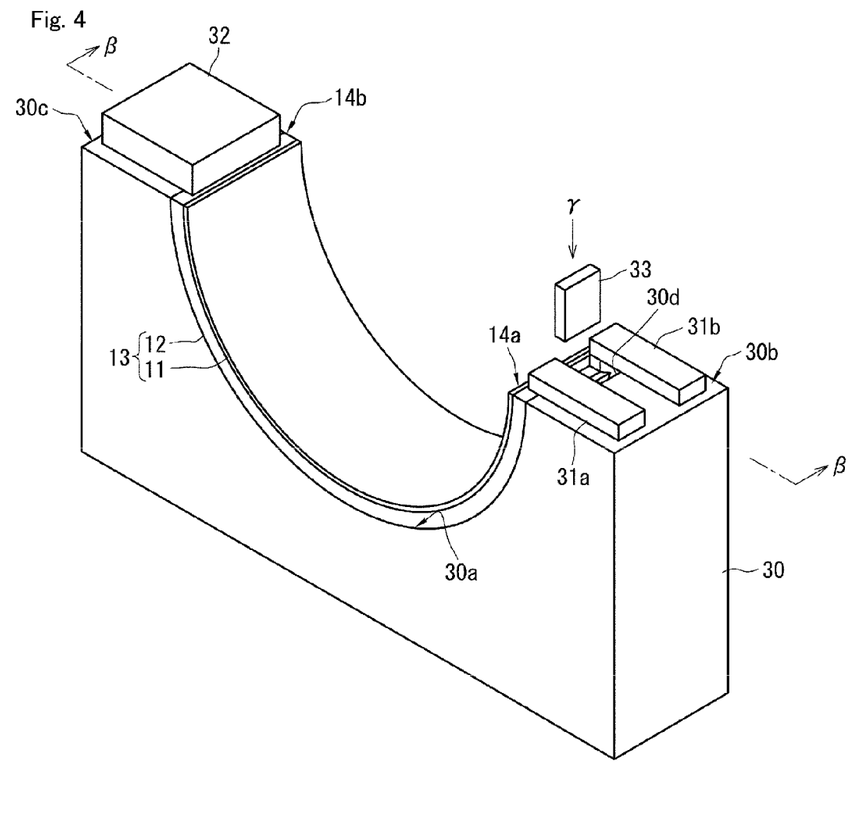
FIG. 4 is a perspective view for explaining a method of forming the positioning member 20 for the half plain bearing 10.

As shown in FIGS. 4 and 5, a dice 30, fixtures (stoppers) 31a, 31b, and 32, and a press tool 33 are used to form the positioning member 20 of the half plain bearing 10.

The dice 30 is a block material formed of an inner peripheral face 30a, upper faces 30b and 30c, and a molded recess portion 30d.

The respective fixtures 31a and 31b are rectangular flat plate-like block materials that are identical in dimension.

The fixture 32 is a rectangular flat plate-like block material.

The press tool 33 is a rectangular flat plate-like block material made of a metal. A working face (a first face) 33a is formed in a flat shape on a bottom face side of the press tool 33.

An outer face (a second face) 33b of the press tool 33 is formed in a flat shape, and the working face 33a and the outer face 33b are perpendicular to each other. It should be noted that no problem or inconvenience is caused as long as at least that region of the outer face 33b which continues to the working face 33a is formed flat. The angle formed between the outer face 33b and the working face 33a (the angle formed by both the faces) is preferably a right angle or an obtuse angle, because this contributes to the durability of the press tool 33.

The angle formed between the working face 33a and an inner face 33c of the press tool 33 is a right angle.

The inner peripheral face 30a of the dice 30 constitutes a curved face in a semi-cylindrical longitudinal section corresponding to the contour of the half plain bearing 10.

The upper faces 30b and 30c of the dice 30 are flat.

Therefore, when the half plain bearing 10 is set on the inner peripheral face 30a of the dice 30, the outer peripheral face of the bearing body 13 is supported by the inner peripheral face 30a in a closely attached state with no gap therebetween.

Thus, the half plain bearing 10 is rotated with respect to the dice 30 and positioned such that the mating faces 14a and 14b of the half plain bearing 10 become flush with the upper faces 30b and 30c of the dice 30, respectively.

Then, the respective fixtures 31a and 31b are securely mounted on the upper face 30b of the dice 30, so that lower face sides of the respective fixtures 31a and 31b are brought into abutment with the mating face 14a of the half plain bearing 10.

Further, the fixture 32 is securely mounted on the upper face 30c of the dice 30, so that a lower face side of the fixture 32 is brought into abutment with the mating face 14b of the half plain bearing 10.

As a result, the half plain bearing 10 is fixed with respect to the dice 30 by being held between the inner peripheral face 30a of the dice 30 and the respective fixtures 31a, 31b, and 32.

The molded recess portion 30d of the dice 30 is a recessed groove (a notch) formed in the upper face 30b with a U-shaped like cross section. The molded recess portion 30d is provided to mold the positioning member 20 of the half plain bearing 10.

Thus, the respective fixtures 31a and 31b are securely mounted at such positions as to avoid the molded recess portion 30d of the dice 30 and avoid a site on the mating face 14a of the half plain bearing 10 where the positioning member 20 is formed.

As a result, the molded recess portion 30d and the site on the mating face 14a of the half plain bearing 10 where the positioning member 20 is formed are exposed at a space between the respective fixtures 31a and 31b.

Then, as indicated by an arrow γ in each of FIGS. 4 to 7, the press tool 33 is lowered toward the molded recess portion 30d from above the dice 30. As shown in FIG. 6(A), the flat working face 33a of the press tool 33 is brought into abutment with a part of the mating face 14a of the half plain bearing 10 which is located on the outer peripheral side of the back metal layer 12.

Subsequently, as shown in FIG. 6(B), when the press tool 33 is lowered in a direction perpendicular to the mating face 14a (substantially in a circumferential direction of the bearing body 13) to press a part of the mating face 14a of the half plain bearing 10 which is located on the outer peripheral side of the back metal layer 12 using the working face 33a of the press tool 33, the pressed back metal layer 12 is plastically deformed. Consequently, the recess portion 21 and the protrusion portion 22 of the positioning member 20 are formed.

At such time, a region of the back metal layer 12 which abuts on the working face 33a of the press tool 33 (the outer peripheral region) constitutes the flat portion 21a of the recess portion 21, and a region of the back metal layer 12 which abuts on the inner face 33c of the press tool 33 constitutes the back wall portion 23. The flat portion 21a and the back wall portion 23 correspond in shape to the faces 33a and 33c of the press tool 33, respectively.

On the other hand, a region of the back metal layer 12 no longer in contact with the press tool 33, namely, a region of the material of the back metal layer 12 which projects radially outward due to being pressed by the press tool 33, is biased toward the outer face 33b side of the press tool 33 as shown in FIGS. 6(B) and 6(C).

Then, when the press tool 33 is further lowered to continue to press the back metal layer 12 as shown in FIG. 6(C), the distance in the radial direction of the half plain bearing 10 from the outer edge of the mating face 14a to the tip region of the protrusion portion 22 (the dimension Y), the distance from the mating face 14a and the tip region of the protrusion portion 22 (the dimension W), and the angle θ of inclination (the angle formed by the inner face portion 22a of the protrusion portion 22 with respect to the flat portion 21a of the recess portion 21) all increase as the amount of biasing of the mating face 14a and the flat portion 21a from each other (the dimension X) increases.

After that, depending on the purpose of use, when the press tool 33 is further lowered to continue to press the back metal layer 12 as shown in FIG. 7, the dimensions X, Y, Z, and W increase. When the tip region of the protrusion portion 22 abuts on a vertical inner peripheral face of the molded recess portion 30d of the dice 30, the dimension Y stops increasing and does not increase further.

In short, the dimension Y is prescribed by the distance between the vertical inner peripheral face of the molded recess portion 30d of the dice 30 and the outer edge of the mating face 14a.

When the press tool 33 stops pressing the back metal layer 12 as soon as a state in FIG. 6(C) or 7 is established, the positioning member 20 of the half plain bearing 10 is completed.

When the positioning member 20 is completed, the angle θ of inclination is larger than 0° and equal to or smaller than 60° (0°<θ≦60°).

In the foregoing description, the single press tool 33 is moved in the same direction (upward and downward in the drawings). However, in order to arbitrarily shape the protrusion portion 22, the press tool 33 can be moved in the radial direction of the bearing body 13 (leftward and rightward in the drawings).

Further, the shape of the protrusion portion can be adjusted using a plurality of press tools whose working faces are different in width from one another. For example, when the amount of pressing by the press tool (an amount of upward or downward movement in the drawings) exceeds a predetermined length, the press tool can be replaced with another press tool with a larger width.

It is also possible to chamfer a region of the press tool where the working face 33a and the outer face 33b intersect (into a curved face or a flat face). The durability of the press tool is enhanced through chamfering.

Construction of Half Plain Bearing 10' According to Related Art

Figure 8:
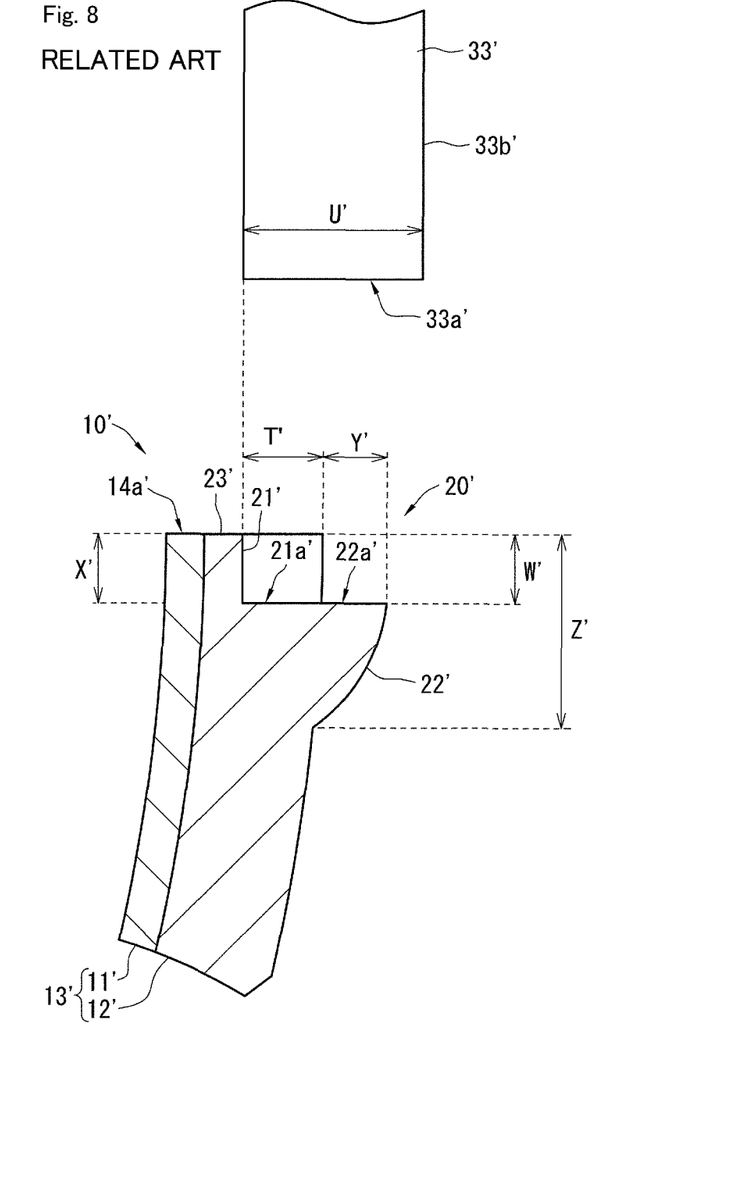
FIG. 8 is a longitudinal sectional view of an essential part of a half plain bearing 10' according to the related art shown in FIGS. 1 to 3 of Patent Document 2 in the vicinity of a positioning member 20'.

FIG. 8 is a longitudinal sectional view showing an essential part of a half plain bearing 10' according to the related art described in Patent Document 1 in the vicinity of a positioning member 20'.

Note that in order to make the description easier to understand, component members and component elements of the related art shown in FIG. 8 which are the same as those in the present embodiment shown in FIGS. 1 to 7 are denoted by the same respective reference symbols suffixed with an apostrophe.

The positioning member 20' according to the related art is different from the positioning member 20 according to the present embodiment shown in FIG. 3 in that an inner face portion 22a' of a protrusion portion 22' is not inclined with respect to a flat portion 21a' of a recess portion 21', and the flat portion 21a' and the inner face portion 22a' are flush with each other.

In Patent Document 1, regarding the method of forming the protrusion portion 22', it is simply described that "an outer protrusion (the protrusion portion 22') applies a large force to a parting face (the mating face 14a') of a bearing shell (the bearing body 13') and an inner side of a bearing is supported by a corresponding receiver to be extruded locally". That is, no description is given at all as to a concrete shape of a press tool 33' for forming the protrusion portion 22' through pressing.

Thus, after conducting repeated experiments, the inventors of the present application have reached the conclusion that the protrusion portion 22' shown in FIG. 8 can only be formed by using the press tool 33' with a bottom face portion 33a' whose thickness U' is sufficiently larger than a sum (V'+Y') of a dimension V' and a dimension Y' (U'>V'+Y'). That is, since the press tool 33' used in the related art has a wide working face 33a', the material of the bearing body does not wrap around to an outer face 33b' of the press tool 33' and remains entirely under the interference of the working face 33a'. As a result, the upper face of the protrusion portion assumes a flat shape flush with the flat portion.

It should be noted that a thickness U of the working face 33a of the press tool 33 is equal to the dimension V in the present embodiment shown in FIG. 3.

Operation and Effect of Present Embodiment

According to the present embodiment, the following operation and effect can be obtained.

Figure 9:
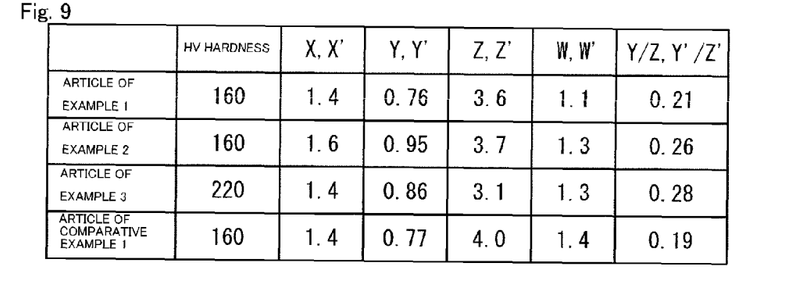
FIG. 9 is a table showing relationships among materials of a back metal layer 12, dimensions Y, Z, X, and W (Y', Z', X', and W'), and Y/Z (Y'/Z') values in this embodiment of the present invention (see FIG. 3) and the related art (see FIG. 8).

FIG. 9 is a table showing relationships among the materials of the back metal layer 12, the dimensions Y, Z, X, and W (Y', Z', X', and W'), and Y/Z (Y'/Z') values in the present embodiment (see FIG. 3) and the related art (see FIG. 8).

In a comparison of an article of Example 1 and an article of Comparative Example 1 (which is formed according to the method of FIG. 8), the dimensions X and X' are equal. However, while the Y/Z value obtained by dividing the dimension Y by the dimension Z in the article of Example 1 is 0.21, the Y'/Z' value obtained by dividing the dimension Y' by the dimension Z' in the article of Comparative Example 1 is 0.19. Thus, in the present embodiment, this value can be increased more than that of the related art by no less than 11%.

An article of Example 2 has the dimension X larger than that of the article of Example 1, but the Y/Z value of the article of Example 2 is equal to or larger than 0.2 as is the case with Example 1.

An article of Example 3 has the back metal layer 12 whose material is made of a hard material with a hardness exceeding 200 (HV). When the article of Example 3 is compared with the article of Example 1, the dimension X remains almost the same. However, the dimension Y of the article of Example 3 is larger than that of the article of Example 1, and the dimension Z of the article of Example 3 is smaller than that of the article of Example 1. The Y/Z value of the article of Example 3 is 0.28, which is larger than that of the article of Example 1. Thus, it is apparent that the present embodiment is particularly well suited for hard materials.

Figure 10:
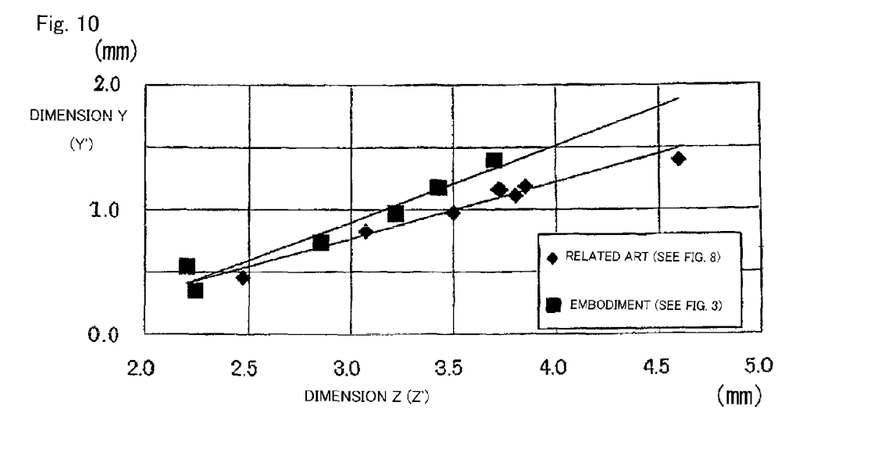
FIG. 10 is a graph showing relationships between the dimension Z and the dimension Y in this embodiment of the present invention (see FIG. 3) and the related art (see FIG. 8).

FIG. 10 is a graph showing relationships between the dimension Z and the dimension Y in the present embodiment (see FIG. 3) and the related art (see FIG. 8).

The ratio of the dimension Y to the dimension Z (the Y/Z value) of the present embodiment can be made larger than the ratio of the dimension Y' to the dimension Z' (the Y'/Z' value) of the related art.

In order to improve the positioning function by facilitating the axial positioning of the half plain bearings 10 and 10' with respect to the respective bearing housings, it is desirable to make the dimensions Y and Y' (the distance in the radial direction of the half plain bearings 10 and 10' from the outer edges of the mating faces 14a and 14a' to the tip regions of the protrusion portions 22 and 22') as large as possible, in accordance with the dimensions of the fitting grooves of the respective bearing housings.

On the other hand, when the fitting groove of the bearing housing is increased in size, problems arise because the manufacturing cost for forming the fitting groove through cutting increases, and the rigidity of the bearing housing decreases.

Thus, in order to reduce the sizes of the fitting grooves of the bearing housings, it is desirable to make the dimensions Z and Z' (the lengths of the protrusion portions 22 in the circumferential direction of the half plain bearings 10) as small as possible while sufficiently ensuring the strength of the respective protrusion portions 22.

Further, when the dimensions Z and Z' increase, the amounts of deformation of the materials from which the bearing bodies are formed also respectively increase. Therefore, a larger load is required of the tools, and the shapes of the bearing bodies are likely to be distorted.

In light of the foregoing, it is preferable to make the Y/Z value as large as possible.

It is apparent from FIGS. 9 and 10 that the Y/Z value of the present embodiment is larger than that of the related art.

The Y/Z value is preferably equal to or larger than 0.2, and more preferably, equal to or larger than 0.25. The upper limit of the Y/Z value can be arbitrarily determined in accordance with the strength required of the positioning member or the like.

This also means that the positioning function of the positioning member 20 can be improved according to the present embodiment even if the back metal layer 12 is thin.

Further, the present embodiment makes it possible to reduce the size of the fitting groove of the bearing housing, thereby decreasing the cost of manufacturing the bearing housing and increasing the rigidity of the bearing housing.

The plastically deformed volume of the material from which the back metal layer 12 is formed is defined by a stroke amount of the press tool (the dimension X) and a width of deformation by the press tool (the dimension V), assuming that the press tool has a predetermined length dimension in the axial direction of the half plain bearing. Comparing the present embodiment shown in FIG. 3 and the related art shown in FIG. 8 (see the article of Example 1 and the article of Comparative Example 1 in particular) on the assumption that the width of deformation by the press tool remains unchanged, the dimension Z of the present embodiment is smaller than the dimension Z' of the related art when the dimensions X and X' are equal (i.e., when the plastically deformed volumes of the materials from which the back metal layers 12 are formed are equal). That is, according to the present embodiment, it is apparent that the component of deformation of the material from which the back metal layer 12 is molded in the circumferential direction thereof is further reduced. In other words, the material from which the back metal layer 12 is formed can be made to efficiently contribute to the formation of the protrusion portion.

Further, when the amount of deformation of the back metal layer 12 in the circumferential direction thereof is small, the stress applied to the bearing body 13 is small. As a result, the bearing body 13 can be more reliably prevented from deforming.

Figure 11:
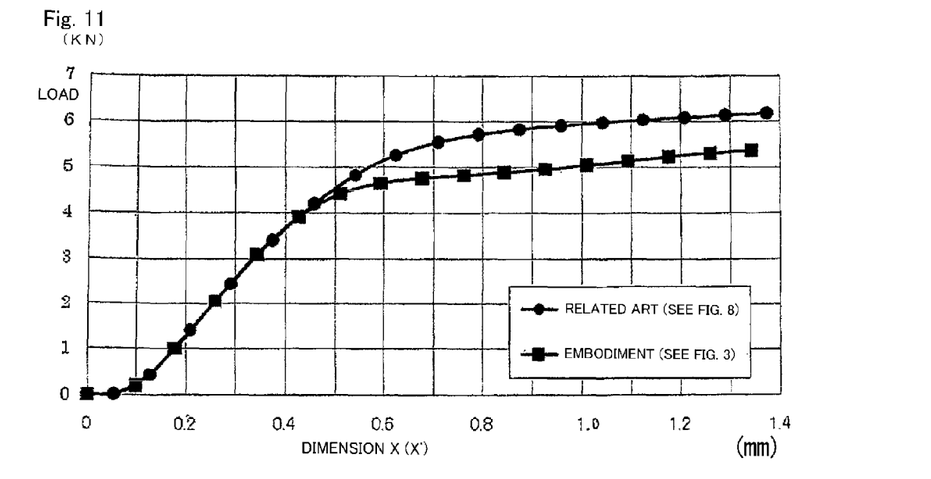
FIG. 11 is a graph showing relationships between the dimension X and a load at which the back metal layer 12 is pressed by press tools 33 and 33' in this embodiment of the present invention (see FIG. 3) and the related art (see FIG. 8).

FIG. 11 is a graph showing relationships between the dimensions X and the loads at which the back metal layers 12 are respectively pressed by the press tools 33 and 33' in the present embodiment (see FIG. 3) and the related art (see FIG. 8).

When the loads at which the press tools 33 and 33' press the back metal layers 12 and 12' respectively increase, the half plain bearings 10 may be unexpectedly deformed. In particular, however, as shown in FIG. 1(B), a peripheral region P of the protrusion portion 22 on the outer peripheral face of the plain half bearing 10 is plastically deformed, such that the half plain bearing 10 tends to become irregular in shape.

When the half plain bearing 10 becomes irregular in shape, there is a risk that correct assembling of the half plain bearing 10 with the bearing housing may not be possible, for example.

It is therefore desirable to make the loads at which the press tools 33 and 33' press the back metal layers 12 and 12', respectively, as small as possible.

As shown in FIG. 11, in the present embodiment, the load at which the press tool 33 presses the back metal layer 12 can be made smaller than in the related art when the dimension X is made sufficiently large. Therefore, the peripheral region P of the protrusion portion 22 on the outer peripheral face of the half plain bearing 10 can be made less susceptible to becoming irregular in shape.

Accordingly, the present embodiment can achieve improved performance by smoothing the outer peripheral face of the half plain bearing 10.

Further, when the loads at which the press tools 33 and 33' press the back metal layers 12 and 12' respectively increase, problems arise because drive units (not shown) for the press tools 33 and 33' are enlarged and the press tools 33 and 33' have a shorter tool life.

According to the present embodiment, the load at which the press tool 33 presses the back metal layer 12 can be made small. Therefore, the drive unit for the press tool 33 can be downsized, and the tool life of the press tool 33 can be prolonged.

As shown in FIG. 12, the width of the recess portion 21 in the radial direction of the mating face 14a of the half plain bearing 10 is expressed as a "dimension T".

In the present embodiment shown in FIGS. 1 to 7, the dimension T and the dimension V (the width of the flat portion 21a of the recess portion 21 in the radial direction of the half plain bearing 10) are equal.

FIG. 12 shows explanatory views for explaining relationships between the thickness U of the working face 33a of the press tool 33 and the dimensions V, Y, and T, which are longitudinal sectional views of an essential part of the half plain bearings 10 in the vicinity of the positioning member 20.

It should be noted that the thickness U and the dimension V are equal.

Figure 12A:
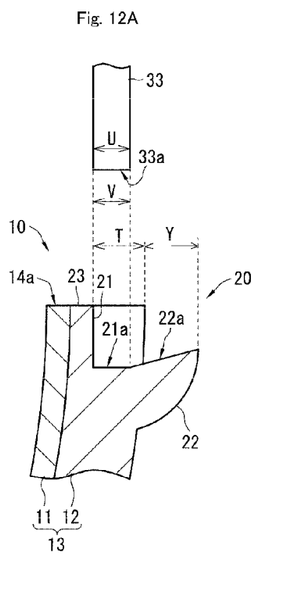
FIG. 12 shows explanatory views for explaining relationships between a thickness U of a bottom face portion 33a of the press tool 33 and the dimensions V, Y, and T, which are longitudinal sectional views of an essential part of the half plain bearing 10 in the vicinity of the positioning member 20.

FIG. 12(A) shows a case where the dimension U (=V) is 30% smaller than the dimension T.

Figure 12B:
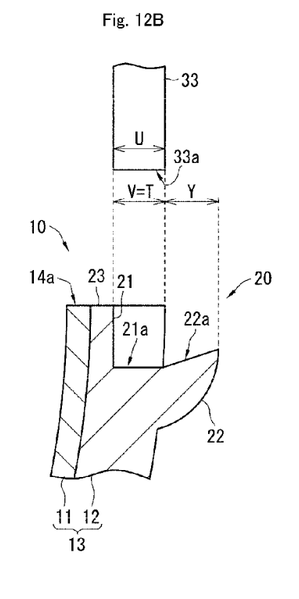

FIG. 12(B) shows a case where the dimension U (=V) and the dimension T are equal as shown in FIGS. 1 to 7.

Figure 12C:
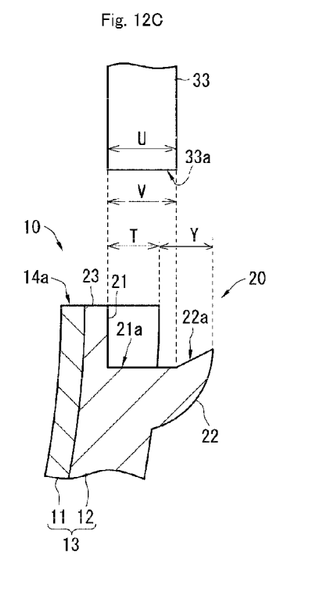

FIG. 12(C) shows a case where the dimension U (=V) is 30% larger than the dimension T.

An appropriate dimensional range of the dimension U (=V) with respect to the dimension T spans from −30% (see FIG. 12(A)) to +30% (see FIG. 12(C)). This dimensional range is desirably within a range of ±20%, and more desirably, 0% (see FIG. 12(B)).

When the dimension U (=V) is within the aforementioned range with respect to the dimension T, the material of the back metal layer 12 is more likely to wrap around to the outer face of the press tool 33. The protrusion portion 22 is thus more likely to protrude by a sufficient amount.

In the present embodiment, the sliding layer 11 located behind the back wall portion 23 of the back metal layer 12 is not deformed, and the inner peripheral face of the sliding layer 11 is smooth overall.

That is, the inner peripheral face of the bearing body 13 located behind the positioning member 20 is smooth.

In consequence, according to the present embodiment, oil is unlikely to leak from the mating face 14a of the half plain bearing 10. Therefore, oil leakage can be reduced.

Further, according to the present embodiment, oil cavitation is unlikely to occur on the inner peripheral face of the sliding layer 11. Therefore, damage to the inner peripheral face of the sliding layer 11 can be reduced.

In the present embodiment, the rectangular flat plate-like press tool 33 is used to form the positioning member 20 through pressing.

The working face 33a as the tip region of the press tool 33 for pressing the back metal layer 12 is in a flat shape with a certain thickness, and is therefore high in strength and less susceptible to breakage.

Accordingly, the present embodiment makes it possible to enhance productivity of the half plain bearing 10 and decrease the manufacturing cost.

When the plain half bearing 10 is led to rotate in the circumferential direction as a rotary shaft (e.g., a crankpin or the like) inserted through the half plain bearing 10 rotates, the function as a plain bearing is lost.

It is thus conceivable to use the positioning member 20 according to the present embodiment as an engagement member for preventing the half plain bearing 10 from rotating in the circumferential direction.

Figure 13A:
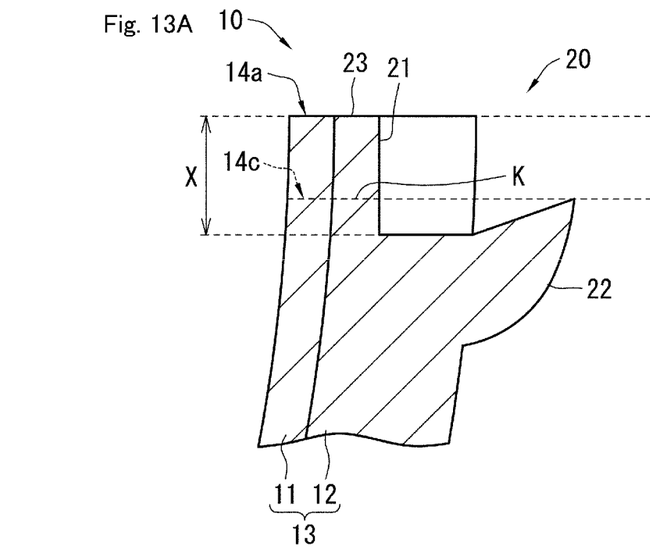
FIG. 13(A) is an explanatory view for explaining a working method when the positioning member 20 is used as an engagement member, which is a longitudinal sectional view showing an essential part of the half plain bearing 10 in the vicinity of the positioning member 20.

FIG. 13(A) is an explanatory view for explaining a working method when the positioning member 20 according to the present embodiment is used as an engagement member, which is a longitudinal sectional view showing an essential part of the half plain bearing 10 in the vicinity of the positioning member 20.

In the sliding layer 11 and the back wall portion 23 of the back metal layer 12, a region corresponding to the dimension W is cut off along a cutting line K.

The original mating face 14a is thus removed, and a new mating face 14c is formed along the cutting line K.

Figure 13B:
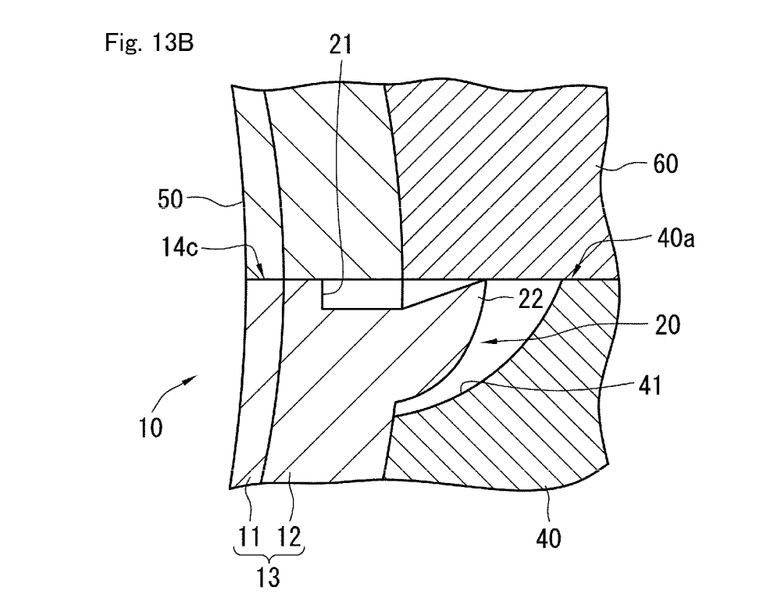
FIG. 13(B) is a longitudinal sectional view of the essential part for explaining a state in which the half plain bearing 10 is assembled with a bearing housing 40 when the positioning member 20 is used as an engagement member.

FIG. 13(B) is a longitudinal sectional view of an essential part for explaining a state in which the half plain bearing 10 is assembled with a bearing housing 40 when the positioning member 20 according to the present embodiment is used as an engagement member.

A fitting groove 41 is formed in a mating face 40a of the bearing housing 40.

In assembling the half plain bearing 10 with the bearing housing 40, the positioning member 20 is fitted into the fitting groove 41 to position the half plain bearing 10 with respect to the bearing housing 40.

At such time, since the mating face 14c extending along the cutting line K is formed on the half plain bearing 10, the mating face 14c of the half plain bearing 10 and the mating face 40a of the bearing housing 40 are located on the same plane.

A half plain bearing 50 forming a pair with the half plain bearing 10 is assembled with a bearing housing 60, and mating faces of the half plain bearing 50 and the bearing housing 60 are flush with each other.

Thus, when the bearing housing 60 is assembled with the bearing housing 40, the mating faces of the half plain bearing 10 and the half plain bearing 50 are firmly attached to each other, and the tip region of the protrusion portion 22 of the positioning member 20 of the half plain bearing 10 abuts on the mating face of the bearing housing 60, so that the positioning member 20 functions as an engagement member.

Accordingly, the half plain bearing 10 is prevented from being led to rotate in the circumferential direction as the rotary shaft (not shown) inserted through each of the half plain bearings 10 rotates.

Meanwhile, in a comparison of the related art shown in FIG. 8 and the present embodiment shown in FIG. 3, the dimension W in the present embodiment is smaller than the dimension W' in the related art when the dimensions Y and Y' are equal.

As shown in FIG. 13(A), in cutting off the region corresponding to the dimension W along the cutting line K, a smaller dimension W is preferable because the cutting amount becomes smaller and the process of cutting easier.

Accordingly, in the present embodiment, since the dimension W is smaller than in the related art, the cutting process of the half plain bearing 10 with the positioning member 20 used as an engagement member is easier to perform. Accordingly, the present embodiment makes it possible to enhance productivity and decrease the manufacturing cost.

Figure 14:
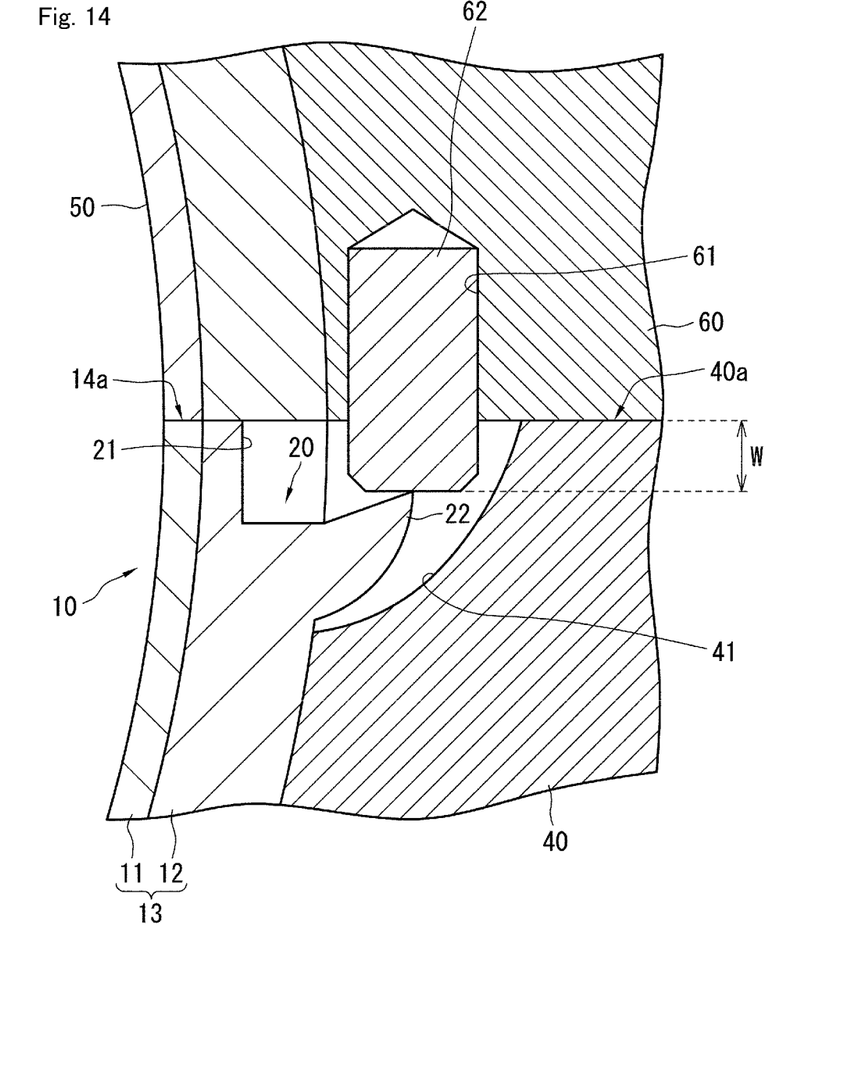
FIG. 14 is a longitudinal sectional view of an essential part for explaining a state in which the half plain bearing 10 is assembled with the bearing housing 40 when the positioning member 20 according to this embodiment of the present invention is used as an engagement member.

FIG. 14 is a longitudinal sectional view of an essential part for explaining a state in which the half plain bearing 10 is assembled with the bearing housing 40 when the positioning member 20 according to the present embodiment is used as an engagement member.

In an example shown in FIG. 14, the half plain bearing 10 is not cut as in an example shown in FIG. 13. Instead, a pin 62 is securely inserted into a mounting hole 61 perforated through the mating face of the bearing housing 60, and a tip region of the pin 62 is brought into abutment with the tip region of the protrusion portion 22 of the positioning member 20 to cause the positioning member 20 to function as an engagement member.

Thus, a smaller dimension W is preferable because the height dimension of the pin 62 can be reduced to cut down on the cost of components.

Accordingly, in the present embodiment, since the dimension W is smaller than in the related art, the pin 62 may be smaller in size when the positioning member 20 is used as an engagement member. Therefore, the present embodiment makes it possible to cut down on the cost of components and also reduce the cost of an entire bearing mechanism shown in FIG. 14.

Other Embodiments

The present invention is not limited to the foregoing embodiment, and may also be practiced in the following manner. In this case as well, an operation and an effect that match or exceed the foregoing embodiment of the present invention can be obtained.

The half plain bearing 10 according to the foregoing embodiment is a double-layer structure. However, the half plain bearing 10 may be a single-layer structure (a solid type) without the back metal layer 12. In such case, the positioning member 20 is formed on a member serving as the sliding layer 11.

Further, the half plain bearing 10 may have a triple-layer structure (a trimetallic type) obtained by adding an overlay to the double-layer structure. Moreover, the half plain bearing 10 may have a multi-layer structure with four or more layers.

In the foregoing embodiment, the single positioning member 20 is formed at the substantially central position in the axial direction of the half plain bearing 10. However, the positioning member 20 is not necessarily formed at the substantially central position, and may be formed at any position on the mating face 14a. Two or more positioning members 20 may be formed on the mating face 14a at appropriate sites thereof. Positioning members 20 may be formed at both end portions of the half plain bearing 10 in the circumferential direction thereof, for example, on the mating faces 14a and 14b, respectively. The position where each positioning member 20 is formed is not particularly limited. For example, the positioning member 20 may be formed at an end portion in the axial direction of the half plain bearing 10.

The present invention is not limited in any manner to the descriptions of the foregoing aspects thereof or embodiments. The present invention also encompasses various modification examples easily conceivable by those skilled in the art provided that such modification examples do not depart from the scope of the appended claims. The content of the patent application unexamined publications and the like as disclosed in the present specification is incorporated herein by reference in its entirety.

DESCRIPTION OF THE REFERENCE NUMERALS

10 Half plain bearing
11 Sliding layer
12 Back metal layer
13 Bearing body
14a, 14b, 14c Mating face
20 Positioning member
21 Recess portion
21a Flat portion
22 Protrusion portion
22a Inner face portion
23 Back wall portion
30 Dice
30a Inner peripheral face
30b, 30c Upper face
30d Molded recess portion
31a, 31b, 32 Fixture
33 Press tool
33a Working face
40 Bearing housing
40a Mating face
41 Fitting groove
50 Half plain bearing
60 Bearing housing
61 Mounting hole
62 Pin

The invention claimed is:

1. A half plain bearing comprising:
a semi-cylindrical bearing body; and
a positioning member formed near a mating face of said bearing body, wherein said positioning member includes a flat portion biased from said mating face in a circumferential direction of said bearing body and a protrusion portion protruding radially outward from said flat portion,
said protrusion portion has a tip located closer to said mating face than a virtual plane that includes said flat portion is to said mating face, and
said protrusion portion has an inner face portion having a surface on a mating face side, the surface of the inner face portion providing an inclination angle with respect to the virtual plane.

2. The bearing according to claim 1, characterized in that a ratio (Y/Z) of a distance Y in a radial direction of said bearing from an outer edge of said mating face to said tip of said protrusion portion to a distance Z in a direction perpendicular to the radial direction from said mating face to a lower edge of said positioning member is equal to or greater than 0.2.

3. The bearing according to claim 2, wherein
said flat portion has an outer peripheral end portion being coincident in position with an outer peripheral face of said bearing body, or being radially shifted from said outer peripheral face within a length range of ±30% of a distance between said outer edge of said mating face and an inner peripheral end portion of said flat portion, where said inner peripheral end portion biased toward said mating face in the circumferential direction of said bearing body.

4. The bearing according to claim 1, wherein said flat portion has an outer peripheral end portion, which is either coincident in position with an outer peripheral face of said bearing body, or radially shifted from said outer peripheral face within a length range of ±30% of a distance between an outer edge of said mating face and a point on said mating face coinciding with an inner peripheral end portion of said flat portion in the circumferential direction of said bearing body.

* * * * *